United States Patent [19]
Rivers-Farrell et al.

[11] Patent Number: 4,611,042
[45] Date of Patent: Sep. 9, 1986

[54] RESINOUS COPOLYMERIC SILOXANES CONTAINING ALKENYLDIMETHYLSILOXANES

[75] Inventors: Stacia A. Rivers-Farrell, Midland; Antony P. Wright, Mills Township, Midland County, both of Mich.

[73] Assignee: Dow Corning Corporation, Midland, Mich.

[21] Appl. No.: 783,713

[22] Filed: Oct. 3, 1985

[51] Int. Cl.$^4$ .............................................. C08G 77/20
[52] U.S. Cl. ........................................ 528/32; 522/99; 556/459; 556/465; 556/453; 556/456; 556/450
[58] Field of Search ............................ 528/32; 522/99; 556/459, 465, 453, 456, 450

[56] References Cited

U.S. PATENT DOCUMENTS

| | | | |
|---|---|---|---|
| 3,527,659 | 9/1970 | Keil | 117/145 |
| 3,873,499 | 3/1975 | Michael | 260/46.5 |
| 4,052,529 | 10/1977 | Bokerman et al. | 428/537 |
| 4,064,027 | 12/1977 | Gant | 204/159.13 |
| 4,107,390 | 8/1978 | Gordon et al. | 428/447 |
| 4,123,604 | 10/1978 | Sandford | 528/31 |
| 4,535,141 | 8/1985 | Kroupa | 528/32 |
| 4,555,529 | 11/1985 | Lee et al. | 528/32 |

FOREIGN PATENT DOCUMENTS 1569681 6/1980 United Kingdom .

*Primary Examiner*—Melvyn I. Marquis
*Attorney, Agent, or Firm*—James E. Bittell

[57] ABSTRACT

A xylene-soluble, resinous copolymer containing $SiO_2$ units, trimethylsiloxane units, and alkenyldimethylsiloxane units such as 5-hexenyldimethylsiloxane units is disclosed. The resinous copolymer is useful as a component in silicone coatings, especially silicone release coatings, to provide intermediate range release forces against adhesives. The higher alkenyl functionality provides faster reaction with other coating components and reduced odor during cure of UV curable mercaptosilicone compositions.

5 Claims, No Drawings

RESINOUS COPOLYMERIC SILOXANES CONTAINING ALKENYLDIMETHYLSILOXANES

BACKGROUND OF THE INVENTION

This invention relates to copolymeric resinous siloxanes containing SiO2 units, trimethylsiloxane units, and alkenyldimethylsiloxane units. The resinous siloxanes are useful in silicone coatings to provide intermediate range release properties for adhesives.

The application of curable silicone compositions to substrates such as paper to aid in the release of adhesive materials therefrom is old and well known in the coatings art. For example, the preparation of laminates consisting of a release paper and a sheet material which may be a decorative lamina or a label material coated with a pressure sensitive adhesive is well known. When it is desired to use the coated sheet material and finally affix it, the release paper is stripped off and discarded.

In many uses, however, it is possible for the release capability of a substrate to be too great. For example, pull-away backings for adhesive tapes must separate without difficulty from the adhesive which they protect, but they must not contain such effective release agents that they accidentally fall off or slide away. Such occurrences are possible with some presently known silicone release agents.

In order to obtain intermediate range release values, Keil, U.S. Pat. No. 3,527,659, teaches the use, in a silicone release composition, of a copolymer of $R_3SiO_{\frac{1}{2}}$ and SiO2 units having no more than 0.6 weight percent silicon-bonded hydroxyl groups, with R denoting a monovalent hydrocarbon radical of no more than 2 carbon atoms. More specifically, Sandford, U.S. Pat. No. 4,123,604, teaches the use of a similar copolymer of $R_3SiO_{\frac{1}{2}}$ units, SiO2 units, and $(CH_2=CH)R_2SiO_{\frac{1}{2}}$ units with R denoting a monovalent hydrocarbon radical of no more than two carbon atoms. Sandford teaches that the use of the copolymer in silicone release compositions curable by the addition of methylhydrogenpolysiloxanes to silicon-bonded vinyl groups provides intermediate range release characteristics.

Although the conventional siloxane release coating compositions normally perform satisfactorily in use, there is a continuing demand for improved compositions. In particular a need has been expressed for compositions which cure faster and which require the application of less energy for the curing step. In response to this need, radiation curable coating compositions such as the mercapto organosiloxane and methylvinylsiloxane combinations disclosed by Michael, et al., U.S. Pat. No. 3,873,499; Gant, U.S. Pat. No. 4,064,027; and Bokerman, et al., U.S. Pat. No. 4,052,529 were developed. However, these compositions met resistance in the marketplace because they emitted an obnoxious odor after the cure process. The odor was quite noticeable, especially when the compositions were used in thin layer applications, such as in a paper coating process.

In order to reduce the odor associated with radiation cure of these types of coating compositions, Gordon, et al., U.S. Pat. No. 4,107,390, teach that the polymethylvinylsiloxanes in the compositions can be replaced by 1,1'-oxy-bis(1-methyl-1-silacyclopentene).

Takamizawa, et al., G.B. Pat. No. 1,569,681, further teach UV curable compositions comprising (a) an organopolysiloxane having in the molecule at least one mercapto-containing organosiloxane unit, (b) an organopolysiloxane having in the molecule at least one allyl-containing organosiloxane unit, and (c) a photosensitizer. Although the odor associated with curing the compositions of these patents is not as marked as that with the vinyl-containing compositions, the unsaturated components used in these compositions are difficult and relatively expensive to prepare.

In still another attempt to reduce the odor associated with radiation cure of siloxane coating compositions, White, et al., copending U.S. patent application Ser. No. 713,940 which is owned by the assignee of this patent application, teach UV curable compositions comprising (a) mercapto group containing organosiloxane, (b) an organosiloxane having at least two siloxane units bearing cyclohexenylethyl substituents ($C_6H_9CH_2CH_2$—), and (c) a photoinitiator.

There is a need for improved components for use in silicone release compositions, especially the radiation curable compositions, to provide intermediate range release for these systems. At the same time, it is desirable that any new component allow even more rapid and efficient cure without emission of obnoxious odor.

SUMMARY OF THE INVENTION

It is an object of this invention to provide a new resinous copolymeric component that is useful in silicone release compositions to provide intermediate range release values for adhesives.

The new resinous copolymeric component of the present invention is a xylene-soluble copolymer consisting essentially of trimethylsiloxane units, alkenyldimethylsiloxane units, and SiO2 units, the mole ratio of alkenyldimethylsiloxane units to trimethylsiloxane units being from 0.02:1 to 0.5:1, the mole ratio of the sum of trimethylsiloxane units and alkenyldimethylsiloxane units to SiO2 units being from 0.6:1 to 1.2:1, and the silicon bonded hydroxyl content of the copolymer being no more than four weight percent, the alkenyldimethylsiloxane units are represented by the formula

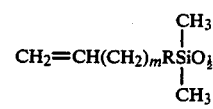

wherein R denotes —$(CH_2)_n$— or —$CH=CH(CH_2)_p$— and m has the value of 1, 2, or 3; n has the value of 3 or 6; and p has the value of 3, 4, or 5.

DETAILED DESCRIPTION OF THE INVENTION

The copolymer of the present invention is soluble in xylene and consists essentially of trimethylsiloxane units, alkenyldimethylsiloxane units, and SiO2 units. The copolymer is further described by the mole ratio of the various siloxane units. The mole ratio of the sum of trimethylsiloxane units and alkenyldimethylsiloxane units to SiO2 units can vary from 0.6:1 to 1.2:1. In addition, the mole ratio of alkenyldimethylsiloxane units to trimethylsiloxane units can vary from 0.02:1 to 0.5:1. For example, the copolymer may contain 1.0 molar part SiO2 units, 0.8 molar part trimethylsiloxane units, and 0.4 molar part alkenyldimethylsiloxane units or alternatively, the copolymer may contain 1.0 molar part SiO2 units, 0.5 molar part of trimethylsiloxane units, and 0.1 molar part of alkenyldimethylsiloxane units.

Generally it is preferred for good reactivity with other coating components and for most efficient use of the alkenyldimethylsiloxane units that the mole ratio of alkenyldimethylsiloxane units to trimethylsiloxane units be from 0.1:1 to 0.3:1 in the copolymer. For example a preferred copolymer may contain 1.0 molar part SiO₂ units, 0.8 molar part trimethylsiloxanes units, and 0.2 molar part alkenyldimethylsiloxane units.

The copolymers of this invention are further characterized by having a silicon-bonded hydroxyl content of no more than four weight percent. It is even more preferred for improved utility in release compositions that the copolymer have a silicon-bonded hydroxyl content of no more than 3.5 weight percent.

The alkenyldimethylsiloxane units in the copolymer of this invention are represented by the formula

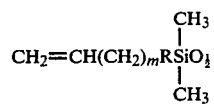

wherein R denotes —(CH$_2$)$_n$— or —CH=CH(CH$_2$)$_p$— and m has the value of 1, 2, or 3; n has the value of 3 or 6; and p has the value of 3, 4, or 5. The alkenyl radicals in the siloxane are denoted by the formula CH$_2$=CH(CH$_2$)$_m$R— and are generally characterized as higher alkenyl radicals because they contain at least 6 carbon atoms. For example, when R denotes —(CH$_2$)—, the higher alkenyl radicals include 5-hexenyl, 6-heptenyl, 7-octenyl, 8-nonenyl, 9-decenyl, and 10-undecenyl. When R denotes —CH=CH(CH$_2$)$_p$—, the saturated carbon is attached to silicon and the double-bond-containing end is attached to the remaining carbon portion of the alkenyl group such that the higher alkenyl radicals include, among others, 4,7-octadienyl, 5,8-nonadienyl, 5,9-decadienyl, 6,11-dodecadienyl and 4,8-nonadienyl. Alkenyl radicals selected from the group consisting of 5-hexenyl, 7-octenyl, 9-decenyl, and 5,9-decadienyl are preferred because of the more ready availability of the α,ω-dienes used to prepare the alkenylsiloxanes. It is more preferred that R denote —(CH$_2$)— so that the radicals contain only terminal unsaturation and it is most preferred that m equals 1 and n equals 3 so that the higher alkenyl radical is a 5-hexenyl radical.

Examples of the alkenyldimethylsiloxane units include, among others, 5-hexenyldimethylsiloxane units, dimethyl-7-octenylsiloxane units, 9-decenyldimethylsiloxane units, 5,9-decadienyldimethylsiloxane units, 6-heptenyldimethylsiloxane units, and dimethyl-8-nonenylsiloxane units. The most preferred alkenyldimethylsiloxane unit is the 5-hexenyldimethylsiloxane unit. Alkenyldimethylsiloxane units are derived from alkenyldimethylchlorosilane which is prepared by the mono-addition of silanes to α,ω-dienes. This addition reaction is further described in U.S. Pat. No. 3,907,852 which is hereby incorporated by reference.

The xylene-soluble copolymers of this invention can be prepared by first forming a precursor copolymer according to the disclosures of U.S. Pat. No. 2,676,182. Precursor copolymers will typically have a silicon-bonded hydroxyl content of about 2 to 6 weight percent or higher. The precursor copolymer can then be reacted with a silanol-reactive triorganosilyl capping agent which is nonreactive with siloxane linkages. For example, agents such as hexamethyldisilazane or 5-hexenyldimethylchlorosilane can be used to cap the precursor copolymer and reduce the silicon-bonded hydroxyl content to the desired value.

As mentioned earlier, the resinous copolymer of this invention should have a mole ratio of alkenyldimethylsiloxane units to trimethylsiloxane units from 0.02:1 to 0.5:1. As indicated above, one way of incorporating the alkenyldimethylsiloxane units in the copolymer is to treat the precursor copolymer with 5-hexenyldimethylchlorosilane or some equivalent capping agent that contains the 5-hexenyldimethylsilyl group. Alternatively, the alkenyldimethylsiloxane units may be incorporated when the resinous copolymer is first made, that is by cohydrolyzing an alkenylsilane such as 5-hexenyldimethylchlorosilane with the other silanes as shown in U.S. Pat. No. 2,676,182. When this method is used, then generally the hydroxyl content of the precursor copolymer is reduced by using trimethylsilyl capping agents instead of an alkenyldimethylsilyl capping agent.

The higher alkenyl functional copolymers of this invention can be used in any of the ways that the vinyl containing copolymers described in U.S. Pat. No. 4,123,604 have been employed. The higher alkenyl functional copolymers are especially useful as a component in curable silicone release coatings to control the release characteristics and provide intermediate release forces. The present copolymers have advantages over the vinyl-containing copolymers in that they can be employed in UV cured mercaptosilicone compositions such as described in U.S. Pat. No. 4,107,390 and copending U.S. patent application Ser. No. 713,940, now U.S. Pat. No. 4,587,136, without contributing to the obnoxious odor associated with the mercapto and vinylsiloxane cure process. It has also been found, surprisingly, that higher alkenyl functional siloxanes such as the higher alkenyl copolymers of this invention react more rapidly and more completely in metal catalyzed additions to SiH functional siloxane polymers. Consequently, the copolymers of this invention can be employed in Pt or other metal curable silicone compositions to provide systems that will cure faster and at lower temperatures than previous silicone compositions containing vinyl functional copolymers. Similarly, higher alkenyl functional siloxanes such as the copolymers of this invention cure surprisingly more efficiently with mercaptosilicones under conditions of electron beam irradiation than the previous vinyl functional siloxanes.

The following examples are presented to illustrate the invention to those skilled in the art and should not be construed as limiting the invention, which is properly delineated in the appended claims. All proportions by parts or percents are by weight unless otherwise stated.

EXAMPLE 1

Hexenyl-functional, resinous copolymer according to the present invention was prepared by combining 5-hexenyldimethylchlorosilane (34.7 g) and a xylene solution (250 g with 71.45 wt. % solids) of a silanol functional copolymer containing 0.9 molar part trimethylsiloxane units and 1 molar part of SiO$_2$ units and having a silicon bonded hydroxyl content as measured by LiAlH$_4$ titration of 6.2 weight percent based on resin solids. The combination was heated to 75° C. and stirred for six hours under a nitrogen atmosphere, and then heated to 90° C. for an additional 0.5 hour with nitrogen purge. After cooling to 75° C., water (10 g) and xylene (100 g) were added to the mixture. The mixture was heated to reflux with the water being removed from the condensate. Additional portions of water were added and removed by distillation until the mixture was neutral and then about 100 g of xylene was removed by distillation.

The residue remaining was a solution of hexenyl functional copolymer in xylene (69.3 wt. % solids) containing some byproduced 1,1,3,3-tetramethyl-1,3-dihexenyldisiloxane. The —OH content was 3.4 wt. % on a solids basis. After removal of the disiloxane by vaporization, the copolymer contained 1.58 wt. % —CH=CH₂ on a solids basis. The copolymer contained 0.9 molar part trimethylsiloxane units, 0.09 molar part 5-hexenyldimethylsiloxane units, and 1 molar part of SiO₂ units.

EXAMPLE 2

A UV-curable coating composition was prepared by first mixing hexenyl functional copolymer solution from Example 1 (100.28 g), cyclohexenyl functional polymer I (80.4 g), and benzophenone (1.2 g). Cyclohexenyl functional polymer I is a trimethylsiloxane-endblocked copolymer of dimethylsiloxane units and cyclohexenylethylmethylsiloxane units with a viscosity of about 2,000 centistokes at 25° C. and generally conforms to the average formula

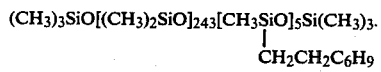

(CH₃)₃SiO[(CH₃)₂SiO]₂₄₃[CH₃SiO]₅Si(CH₃)₃.
          |
          CH₂CH₂C₆H₉

The mixture was stripped for 0.5 hour at 150° C. and 10 torr to remove most of the xylene. After stripping, the mixture had a nonvolatile content of 92.7 wt. % and contained 1.64 wt. % —CH=CH₂ units, and had a viscosity at 25° C. of 8,500 centistokes.

Next, mercapto polymer II (113.74 g) and benzophenone (1.73 g) were combined with a portion of the stripped mixture from above (100 g). Mercapto polymer II is a trimethylsiloxane-endblocked copolymer of dimethylsiloxane units and mercaptopropylmethylsiloxane units with a viscosity of about 300 centistokes at 25° C. and generally conforms to the average formula

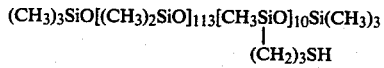

(CH₃)₃SiO[(CH₃)₂SiO]₁₁₃[CH₃SiO]₁₀Si(CH₃)₃
          |
          (CH₂)₃SH

The composition was coated onto S2S kraft paper using a trailing blade coater at 34 psi blade pressure. The coating was cured by passing, at a distance of about 80 mm, under two 20 inch Hanovia ® medium pressure lamps having an input of 200 watts/inch, an output of 1.4 kW/m in the ultraviolet and a UV maximum at 366 nm. Each lamp had a window 7 inches wide so that a speed of 60 ft/min resulted in an total exposure time of 1.16 seconds. The compositions cured when passed under the lamps at a speed of 60 ft/min.

The cured release coating was prepared for release testing by laminating immediately after curing with National Starch and Chemical Company's 36-6045 SBR ® adhesive according to the following procedure. Adhesive solution was applied to the cured coating at a wet thickness of 3 mils using a Bird bar. The adhesive was cured two minutes at 90° C. and a sheet of 42 pound label paper was applied to the dried adhesive and the resulting laminate was rolled with a 4.5 pound rubber-coated roller and aged for 24 hours at room temperature.

Release testing of the laminate was accomplished by cutting the laminate into one-inch wide strips and pulling the label/adhesive lamina from the paper/silicone lamina at an angle of 180 degrees at 400 inches per minute. The force that was required to separate the laminae was 108 grams per inch. For comparison a similar coating containing a 2 to 1 mixture by weight of cyclohexenyl functional polymer I and mercapto polymer II without the copolymer prepared in Example 1 above, gives a release force of 50 grams per inch when tested in the same way.

EXAMPLE 3

Hexenyl functional copolymer according to the present invention was prepared as described in Example 1 above except that 26.6 g of 5-hexenyldimethylchlorosilane was combined with the 250 g of xylene solution of silanol functional copolymer and the combination was heated for 3 hours instead of 6 hours at 75° C.

The product was a solution of hexenyl functional copolymer in xylene (67.9 wt. % solids) containing some byproduced 1,1,3,3-tetramethyl-1,3-dihexenyl-disiloxane. After removal of the disiloxane by vaporization, the copolymer contained 1.29 wt. % —CH=CH₂ on a solids basis. The copolymer contained 0.9 molar part trimethylsiloxane units, about 0.07 molar part 5-hexenyldimethylsiloxane units, and 1 molar part of SiO₂ units.

EXAMPLE 4

This example is presented to illustrate the faster reactivity of the 5-hexenylsilyl unit toward SiH in comparison to vinylsilyl units. In this experiment model compounds instead of polymers are used so that the rate of the SiH reaction can be more easily monitored.

The reactivity rates were compared by glc chromatograph analysis of equimolar mixtures of the olefin-containing model compound and 1,1,1,3,5,5,5-heptamethyl-trisiloxane. The mixtures contained 7 mg Pt per mole of SiH compound. Platinum was added as a soluble complex formed from chloroplatinic acid and divinyltetramethyldisiloxane. The results are presented in Table 1.

TABLE 1

| Model Compound | Temperature (°C.) | Time (minutes) | Percent Model Compound Reacted |
|---|---|---|---|
| (Me₂ViSi)₂O | 80 | 263 | 75 |
| (Me₂HexSi)₂O | 80 | 30 | 75 |
| Me₂ViSiCl | 60 | 200 | 84 |
| Me₂HexSiCl | 60 | 10 | 80 |

Me represents CH₃—;
Vi represents CH₂=CH—;
Hex represents CH₂=CH(CH₂)₄—

EXAMPLE 5

This example is presented to illustrate the results of the simultaneous, competitive reaction of vinylsiloxane and hexenylsiloxane unit with SiH. Model compounds are used again in this experiment so that the course of the reaction can be monitored.

An equimolar mixture of 1,1,3,3-tetramethyl-1,3-divinyldisiloxane, 1,1,3,3-tetramethyl-1,3-dihexenyldisiloxane, and 1,1,1,3,5,5,5-heptamethyltrisiloxane was prepared containing 7 mg Pt per mole of SiH compound. Platinum was added as a soluble complex formed from chloroplatinic acid and divinyltetramethyldisiloxane. The mixture was heated to 80° C. and the progress of the hydrosilation reaction was determined by glc chromatography of the reaction mixture.

The glc peak area percent for the two products of the reaction are shown in Table 2. The data shows that the vinylsiloxane reacts preferentially with the SiH component when vinyl and hexenylsiloxanes are both present.

TABLE 2

| Time | Vinylsiloxane SiH Adduct | 5-Hexenylsiloxane SiH Adduct |
|---|---|---|
| 0 | 0 | 0 |
| 90 min. | 8.6 | 0.93 |
| 235 min. | 17.4 | 2.0 |

That which is claimed is:

1. A xylene-soluble copolymer consisting essentially of trimethylsiloxane units, alkenyldimethylsiloxane units, and $SiO_2$ units, the mole ratio of alkenyldimethylsiloxane units to trimethylsiloxane units being from 0.02:1 to 0.5:1, the mole ratio of the sum of trimethylsiloxane units and alkenyldimethylsiloxane units to $SiO_2$ units being from 0.6:1 to 1.2:1, and the silicon bonded hydroxyl content of the copolymer being no more than four weight percent, the alkenyldimethylsiloxane units are represented by the formula

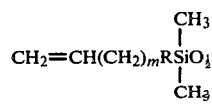

wherein R denotes —$(CH_2)_n$— or —$CH=CH(CH_2)_p$— and m has the value of 1, 2, or 3; n has the value of 3 or 6; and p has the value of 3, 4, or 5.

2. The copolymer of claim 1 wherein the silicon bonded hydroxyl content of the copolymer is no more than 3.5 weight percent and the mole ratio of alkenyldimethylsiloxane units to trimethylsiloxane units is from 0.1:1 to 0.3:1.

3. The copolymer of claim 2 wherein the alkenyl radicals in the alkenyldimethylsiloxane units are selected from the group consisting of 5-hexenyl, 7-octenyl, 9-decenyl, and 5,9-decadienyl.

4. The copolymer of claim 2 wherein R denotes —$(CH_2)_n$—.

5. The copolymer of claim 4 wherein the alkenyldimethylsiloxane unit is 5-hexenyldimethylsiloxane.

* * * * *